Feb. 23, 1937. C. F. DAVIS Re. 20,275

GYPSUM LUMBER

Original Filed March 18, 1931 2 Sheets-Sheet 1

INVENTOR.
CLARKE F. DAVIS,
BY Ellis S. Middleton
ATTORNEY.

Feb. 23, 1937. C. F. DAVIS Re. 20,275

GYPSUM LUMBER

Original Filed March 18, 1931 2 Sheets-Sheet 2

INVENTOR.
CLARKE F. DAVIS,
BY Ellis S. Middleton
ATTORNEY.

Reissued Feb. 23, 1937 Re. 20,275

UNITED STATES PATENT OFFICE 20,275

GYPSUM LUMBER

Clarke F. Davis, Short Hills, N. J., assignor, by mesne assignments, to American Cyanamid & Chemical Corporation, a corporation of Delaware Original No. 1,854,396, dated April 19, 1932, Serial No. 523,523, March 18, 1931. Application for reissue April 14, 1934, Serial No. 720,653

11 Claims. (Cl. 72—68)

This invention relates to a fire-resisting precast slab and to a building construction embodying the same.

The principal object of the invention is the provision of a structural unit having requisite strength, desirable fire-resisting qualities, great flexibility in its application, which may be cheaply and efficiently produced and which may be put to substantially all the uses for which a wooden plank of corresponding size is now used.

In present day building construction there are many types of floors and roof decks ranging from wooden structures involving the use of planking to poured-in-place concrete or gypsum constructions having maximum fire-resisting qualities. There is a wide range in the relative costs of these various types of constructions, based not only upon the initial cost of production of the material, but dependent to a great extent upon the necessary manipulation in erection.

The present invention is designed to produce a cheap structural unit capable of mass production, which is simple to erect, having all of the desirable characteristics of wood planking, particularly as to its mode of application, its capability of being sawed, its ability to hold nails without cracking or spalling, being comparable thereto as to strength and weight, while at the same time having the desirable characteristics of gypsum constructions such as insulating value and fire-resisting qualities.

To this end the invention contemplates the provision of a structural unit comprising a framework of comparatively light structural metallic members such as channels, with a poured, set body therebetween of cementitious material such as gypsum, with such admixtures of fillers so as to be readily sawed and which will receive and hold nails without cracking or spalling. Opposite metallic structural members are provided with mating joints such as tongues and grooves respectively so that when assembled in place each structural unit or precast slab will interlock with its neighbor and thus distribute its load and contribute to the strength of the entire structure. In the preferred form, all four sides of the slab are provided with these metallic members which, therefore, constitute the edge portions of the slab. Opposite members of each pair are tongued and grooved respectively, or otherwise mated, that is, the slab is tongued and grooved both at its longitudinal sides and at the ends.

The invention further consists in the novel arrangement, combination and construction of parts more fully hereinafter shown and described.

In the drawings—

Figure 1:
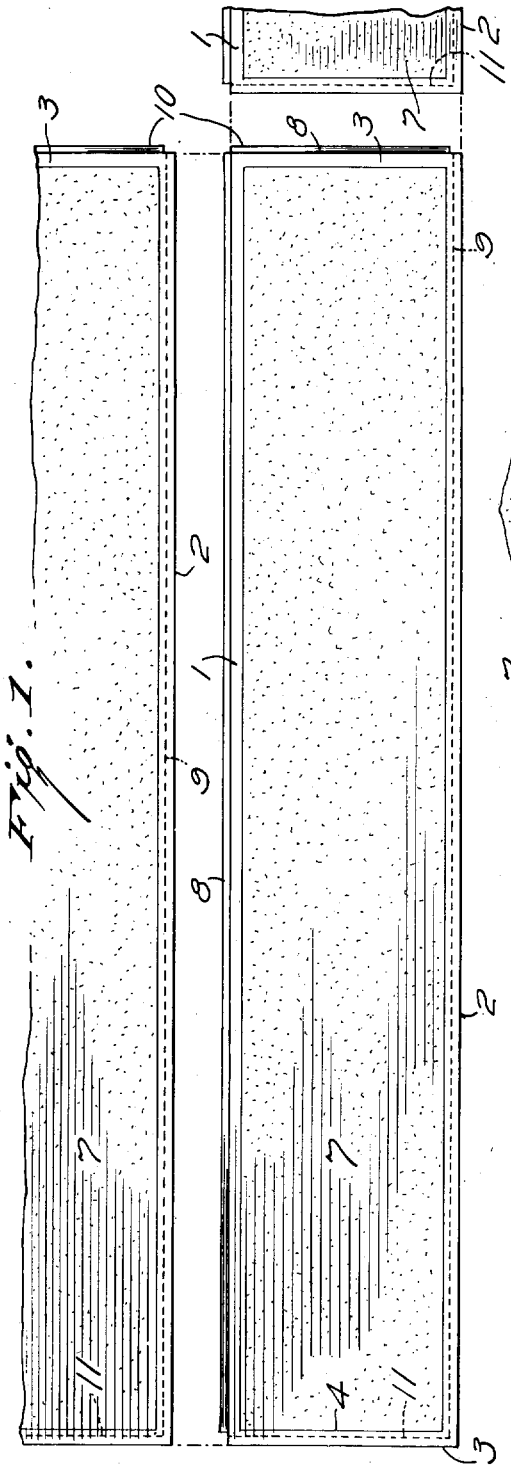
Fig. 1 is a plan view of a slab of this invention showing portions of others.

Referring now with particularity to the embodiment illustrated, I have shown a precast slab A having metallic structural members 1 and 2, constituting the longitudinal sides or edges of the slab, and members 3 and 4 at the ends thereof. Each of these members consists essentially of a channel having top and bottom flanges 5 and 6 respectively overlying a body 7 of set cementitious material poured between the structural members. This cementitious material may be gypsum with or without an admixture of about 3% of wood chips as a filler, for the reason that this mixture is light, is readily sawed, may be nailed, sets quickly and has the requisite strength.

The structural member 1 is provided with a longitudinal tongue shown at 8, which may be formed in such a manner as to taper from the end toward the vertical portion of the member 1. The structural member 2 is provided with a longitudinal groove 9 similarly tapered as in the case of the tongue 8 and adapted to receive the tongue of the neighboring slab. In the same manner, the end structural element 3 is provided with a tongue 10 and the opposite end member 4 with a groove 11.

In some instances, it may be desirable to secure the various structural members to each other at their abutting edges as by welding or the like and in such case, this construction tends to contribute rigidity to the entire slab. This construction is not essential, however, as it has been found that there need be no connection whatever between the series of structural members, but on the contrary they may have their ends adjacent each other and rely simply upon the bond between the interfaces thereof and the body of cementitious material to hold them in place. This bond is sufficient for handling purposes and, of course, when the various units are assembled into a building construction and the mating portions interlocked, each slab is entirely supported at its four edges by its neighboring slabs and hence no other connection is necessary, between the various structural members. Where desired, however, one unit may be toe nailed to its neighbor.

Figure 4:
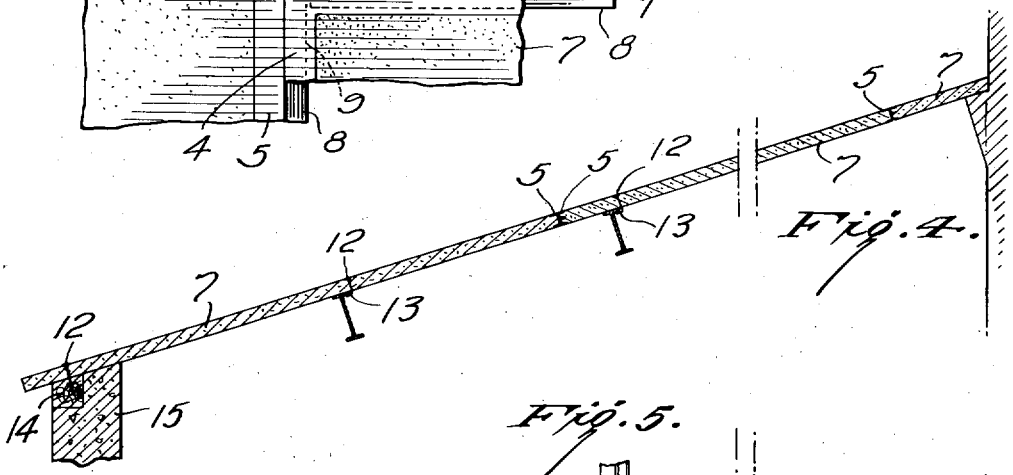
Fig. 4 is an elevation of a roof deck.
Figure 5:
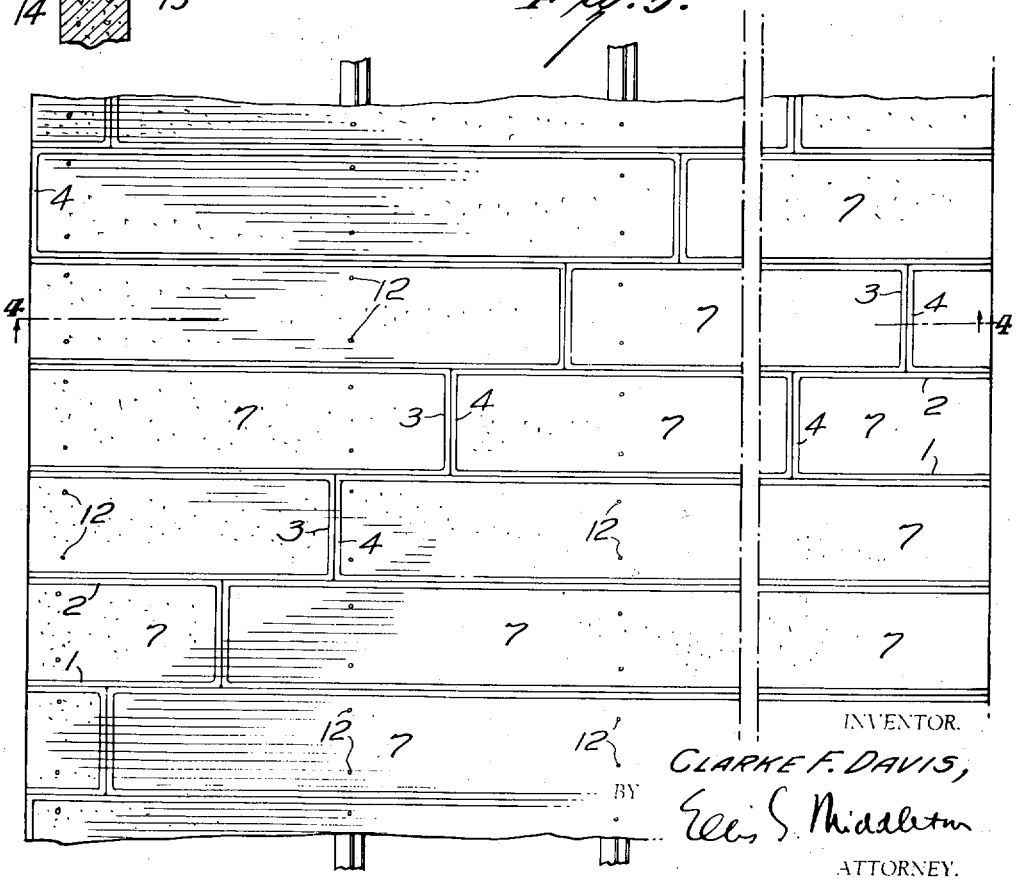
Fig. 5 is a plan view of a roof or floor construction.

In assembling the various units in a roof construction, for instance, it is not necessary that a special purlin or beam spacing be utilized. The slabs being made in substantial sizes, for convenience approximately 15 inches wide, 12 ft. long and 2 inches thick, they more than bridge the gap between ordinary roof or floor supports. This provides a very convenient form of roof or floor unit having a wide application to many circumstances, termed "constructional flexibility" in the trade. It is to be noted at this point that the ratio of support spacing to slab thickness is not less than 24:1, see Fig. 4. This proportion is possible even with such material as gypsum, which is inherently weak, by the provision of the longitudinal metallic members which are interlocked together. By using this proportion of supporting element spacing to slab thickness, it enables a slab to be constructed which is still of a weight convenient to be handled by two men. As an example, where the slab is substantially two inches thick, the beam spacing need not be closer than twenty-four times this dimension or 4 ft. on centers. In applying the units, they may, for instance, be laid down from the peak toward the eaves or from wall to wall on floors, regardless of purlin or beam spacings, and if the distance between the peak and the eaves is greater than 12 ft., other units may be applied at the end of the preceding units, the ends of each abutting and being interlocked and the excess length of the final unit cut off as by means of a saw. The structural elements being of comparatively light gauge, they may be readily cut with a hack-saw or its equivalent, and a body of gypsum with an ordinary ice saw. This severed slab may then be used to begin the next row of units, which causes a break joint arrangement, thus greatly increasing the strength in this type construction. Due to the fact that this cut off section is supported at three sides by its neighboring slabs, it is not even essential that it rest upon a purlin. Sufficient strength and support is contributed by the neighboring slabs to provide a strong and satisfactory construction. This is principally for the reason that the interlocked and tongued and grooved together metallic members constitute an I beam in which the extent of the vertical web is greater than the thickness of the base of the tongue.

Due to the fact that the body of gypsum may readily receive nails, nails or spikes 12 may be driven directly through the same into the beams or purlins where they are of wood, or through the material and in proximity to the beams or purlins, where they are of metal, so that the protruding end of the nail or spike may be clinched below the flange as at 13. Of course, in many cases, it will not be necessary to secure the slabs to the purlins at all, but this may be done, if desirable. In a roof construction, a nailing strip 14 may be supplied in the wall 15 to which the end slab may be nailed and thus assist in preventing slippage of the entire row of slabs. Due to the fact that the various tongues and grooves are wedge-shaped and have great frictional contact with each other, this end nailing may be dispensed with entirely although it may be used where desirable.

Figure 2:
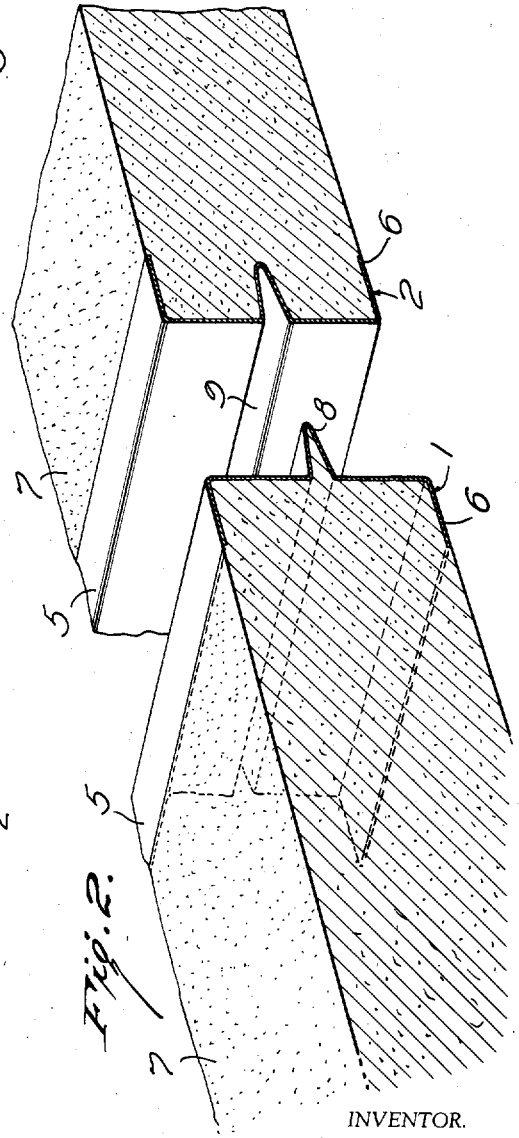
Fig. 2 is a fragmentary perspective view of two slabs.
Figure 3:
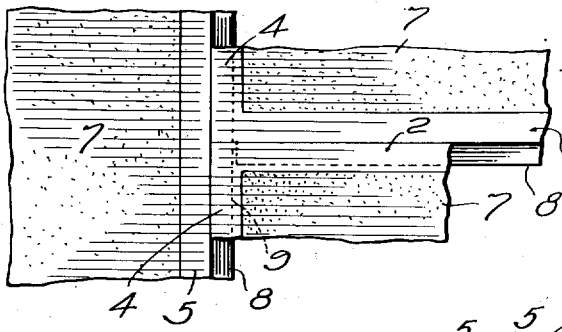
Fig. 3 is a partial plan view of a joint between three slabs.

As clearly shown in the drawings, and particularly Fig. 2 thereof, the tongue and groove there shown are each wedge-shaped, and due to their angularity have great frictional contact with each other. As shown, the plane of each face of the tongue and each face of the groove when extended makes an angle less than 45° with the plane of one face of the slab. The fact that this angle is not greater than 45° prevents any tendency of the mated or interlocked members from slipping one on the other due to this great frictional contact when a load is applied vertically to the upper face of the mated slabs. If the angle in question was greater than 45° there would be every tendency for one face of the member constituting the groove to slip off of the corresponding face of that member constituting the tongue. For this reason it is not ordinarily necessary to nail one slab to the other to prevent separation of the two even under load.

A roof constructed as above may have applied thereto any of the various types of waterproof roofings either in sheet form, which may be nailed or tacked directly to the body of gypsum, or the slabs may be mopped with tar or pitch. In the latter case, the interlocking tongue and groove constitutes a pitch stop and thus prevents leakage of the tar or pitch between the slabs.

It will be obvious that the same construction may be used in the floors of a building and that this arrangement may support any of the desired type of floor finishes such as cinder fill, concrete, terrazzo or wood. In the latter case, the wood floor may be nailed directly to the body of gypsum material.

The slabs as above constructed are comparable as to cost, with wood planking of the same thickness, and weigh only slightly more, but still being capable of being handled by two men, as would be required with a wooden plank of similar size. It may be put to the uses for which a wooden plank is now adapted but in addition it has insulating and fire-resisting qualities which make it far superior to wood. Such a floor or roof construction has the desirable characteristics of a gypsum precast slab or poured-in-place construction but avoids many of the intricate operations necessary in their erection. In addition, no grouting is necessary with such a construction. Also, as the slabs pass over purlins or beams, they are not dependent upon the width of purlin or beam flanges for their support as are units which are adapted to extend only from beam to beam.

While the invention has been shown and described with reference to a specific embodiment, obviously I do not wish to be limited thereto but the invention is to be construed broadly and limited only by the scope of the claims.

I claim:

1. A precast slab of set plastic material having on all four edges thereof metallic members, each of which is provided with a horizontal flange substantially parallel with the top face of the slab, one pair of members being tongued and the other pair being grooved, said tongues and grooves being sharply wedge-shaped the angle of the wedge being less than 45°.

2. A precast slab of set plastic material having on two opposite edges thereof metallic members, each of which is provided with a horizontal flange substantially parallel with the top face of the slab, one pair of members being tongued, and the other pair being grooved, said tongues and grooves being wedge-shaped and of greater length than thickness.

3. A building construction comprising spaced apart supporting elements, precast slabs of set plastic material supported thereon, said slabs having longitudinal metallic edge members, said members of adjacent slabs being interlocked, some of said slabs being supported by at least two of said supporting elements, the ratio of supporting element spacing to slab thickness being not less than 24:1.

4. A building construction comprising spaced apart supporting elements and precast slabs of set plastic material supported thereon, said slabs having metallic edge members, said members on adjacent slabs being tongued and grooved together, in great frictional contact, some of said slabs being of a length greater than the supporting element spacing, the ratio of supporting element spacing to slab thickness being not less than 24:1.

5. A building construction comprising spaced apart supporting elements and precast slabs of set plastic material supported thereon, said slabs having metallic edge members, said members on adjacent slabs being tongued and grooved together, the tongues and grooves being of greater length than thickness, the metallic members between slabs constituting I beams.

6. A building construction comprising spaced apart supporting elements and precast slabs of a set plastic material supported thereon, said slabs having metallic edge members, said members on adjacent slabs being tongued and grooved together, the tongues and grooves being of greater length than thickness, the metallic members between slabs constituting I beams, said I beams being at right angles to the supporting elements.

7. A building construction comprising a series of spaced apart supporting elements, precast slabs having longitudinal metallic edge portions supported thereon with their edges adjacent, said slabs having their adjacent metallic edge portions tongued and grooved together, said metallic edge members together constituting an I beam in which the extent of the vertical web thereof is substantially greater than the thickness of the base of the tongue.

8. A precast slab of set plastic material having on its longitudinal edges metallic members, each of which is provided with a horizontal flange substantially parallel with the top face of the slab, one of said members being tongued and the other member being grooved, said tongue and groove being of greater length than thickness.

9. A precast slab of set plastic material having on two opposite edges thereof metallic members, one of which is tongued, the other being correspondingly grooved, the plane of one face of the tongue and the plane of one face of the groove, when extended, making an angle less than 45° with the plane of one face of the slab.

10. A building construction comprising spaced apart supporting elements and metallic edged slabs supported thereon, said metallic edge members on adjacent slabs being tongued and grooved together, the plane of one face of the tongue and the plane of one face of the groove, when extended, making an angle less than 45° with the plane of one face of the slab, the ratio of supporting element spacing to slab thickness being not less than 24:1.

11. In a building construction, a plurality of preformed gypsum slabs arranged in a plane, each slab having on at least one pair of opposite edges metallic members, said members having inwardly turned flanges in the planes of the slab surfaces and forming edge reinforcements for opposite edges of each of said slabs, adjacent metallic members being tongued and grooved together in a tight frictional joint, and means for supporting said slabs.

CLARKE F. DAVIS.